United States Patent
Craig

(10) Patent No.: US 10,076,077 B2
(45) Date of Patent: Sep. 18, 2018

(54) DUAL SUGARCANE BILLET TRANSPORTATION SYSTEM

(71) Applicant: DEERE & COMPANY, Moline, IL (US)

(72) Inventor: Paul I. Craig, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 338 days.

(21) Appl. No.: 14/921,280

(22) Filed: Oct. 23, 2015

(65) Prior Publication Data

US 2017/0112063 A1    Apr. 27, 2017

(51) Int. Cl.
| | | |
|---|---|---|
| A01D 45/10 | (2006.01) | |
| A01D 61/02 | (2006.01) | |
| A01D 61/00 | (2006.01) | |

(52) U.S. Cl.
CPC ............. *A01D 61/02* (2013.01); *A01D 45/10* (2013.01); *A01D 61/008* (2013.01)

(58) Field of Classification Search
CPC ....... A01D 61/02; A01D 61/008; A01D 45/10
USPC ................ 56/13.9, 60, 71, 76, 79, 83, 327.1
See application file for complete search history.

(56) References Cited

U.S. PATENT DOCUMENTS

| | | | | |
|---|---|---|---|---|
| 1,726,043 A | | 8/1929 | Scranton | |
| 2,122,052 A | * | 6/1938 | Bell ........................ | A01D 61/02 198/604 |
| 2,131,273 A | * | 9/1938 | Coultas .............. | A01D 41/1208 56/473.5 |
| 2,647,525 A | * | 8/1953 | Duda ................... | A01D 46/243 134/104.4 |
| 3,548,950 A | * | 12/1970 | Phelan .................... | A01D 45/00 171/39 |
| 3,628,316 A | * | 12/1971 | Rea, Sr. ................. | A01D 45/02 56/119 |
| 3,690,358 A | * | 9/1972 | Tilby ........................ | C13B 5/00 241/60 |
| 4,177,953 A | | 12/1979 | Ribeiro Pinto | |
| 4,295,325 A | | 10/1981 | Cannavan | |
| 4,550,552 A | | 11/1985 | Stiff | |
| 5,799,474 A | * | 9/1998 | Ingram ................ | A01D 45/263 56/119 |
| 6,003,293 A | * | 12/1999 | Boese .................... | A01D 45/00 56/119 |
| 7,966,796 B2 | * | 6/2011 | Leach .................... | A01D 45/00 171/22 |
| 8,240,115 B2 | * | 8/2012 | Marchini ............... | A01D 45/10 56/63 |
| 2007/0163606 A1 | | 7/2007 | Chojnacki et al. | |

(Continued)

FOREIGN PATENT DOCUMENTS

AU             632145 B2    12/1992

*Primary Examiner* — Thomas B Will
*Assistant Examiner* — Mai T Nguyen

(57) ABSTRACT

A billet transportation system for a sugarcane harvester having an onboard storage for receiving billets. The billet transportation system includes a first belt configured to receive billets from the onboard storage and transport billets away from a first portion of the sugarcane harvester to a target location. A second belt is configured to receive billets from the onboard storage and transport billets away from a second portion of the sugarcane harvester to the target location. At least one metering device is configured to control the flow of billets from the onboard storage to the first and second belts.

17 Claims, 4 Drawing Sheets

(56) References Cited

U.S. PATENT DOCUMENTS

| | | | |
|---|---|---|---|
| 2009/0165433 A1* | 7/2009 | Jauncey | A01D 45/26 56/14.5 |
| 2015/0053593 A1* | 2/2015 | Brown | A01G 1/00 209/3.1 |
| 2015/0173298 A1 | 6/2015 | Jager | |
| 2015/0307121 A1* | 10/2015 | Liu | B62B 7/08 280/650 |

* cited by examiner

DUAL SUGARCANE BILLET TRANSPORTATION SYSTEM

FIELD OF THE DISCLOSURE

The present disclosure generally relates to harvesters, and more particularly to a dual billet transportation system for a sugarcane harvester.

BACKGROUND OF THE DISCLOSURE

In order to transport crops from a harvester to a wagon, an elevator is commonly used that pulls a slat along a fixed floor to move the crop.

SUMMARY OF THE DISCLOSURE

In one embodiment, a sugarcane harvester is disclosed. The sugarcane harvester comprises a basecutter configured to cut sugarcane. A feeding device is in communication with the basecutter to receive and feed the cut sugarcane into the sugarcane harvester. A chopping device is in communication with the feeding device. The chopping device is configured to chop the cut sugarcane received from the feeding device into billets. A primary extractor is in communication with the chopping device and configured to extract debris from the billets. An onboard storage is in communication with the primary extractor and configured to receive billets. A billet transportation system is in communication with the onboard storage and configured to receive billets and propel the billets to a target location. The billet transportation system comprises a first belt configured to receive billets from the onboard storage and transport billets away from a first portion of the sugarcane harvester. A second belt is configured to receive billets from the onboard storage and transport billets away from a second portion of the sugarcane harvester. At least one metering device is configured to control the flow of billets from the onboard storage to the first and second belts.

In another embodiment, a billet transportation system for a sugarcane harvester having an onboard storage for receiving billets is disclosed. The billet transportation system comprises a first belt configured to receive billets from the onboard storage and transport billets away from a first portion of the sugarcane harvester to a target location. A second belt is configured to receive billets from the onboard storage and transport billets away from a second portion of the sugarcane harvester to the target location. At least one metering device is configured to control the flow of billets from the onboard storage to the first and second belts.

In yet another embodiment, a sugarcane harvester is disclosed. The sugarcane harvester comprises a basecutter configured to cut sugarcane. A feeding device is in communication with the basecutter to receive and feed the cut sugarcane into the sugarcane harvester. A chopping device is in communication with the feeding device. The chopping device is configured to chop the cut sugarcane received from the feeding device into billets. A primary extractor is in communication with the chopping device and configured to extract debris from the billets. An onboard storage is in communication with the primary extractor and configured to receive billets. A backboard is coupled to the onboard storage and configured to limit billets from falling off the sugarcane harvester. A billet transportation system is in communication with the onboard storage and configured to receive billets and propel the billets to a target location. The billet transportation system comprises a first belt configured to receive billets from the onboard storage and transport billets away from a first portion of the sugarcane harvester. A second belt is configured to receive billets from the onboard storage and transport billets away from a second portion of the sugarcane harvester. At least one metering device is configured to control the flow of billets from the onboard storage to the first and second belts.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
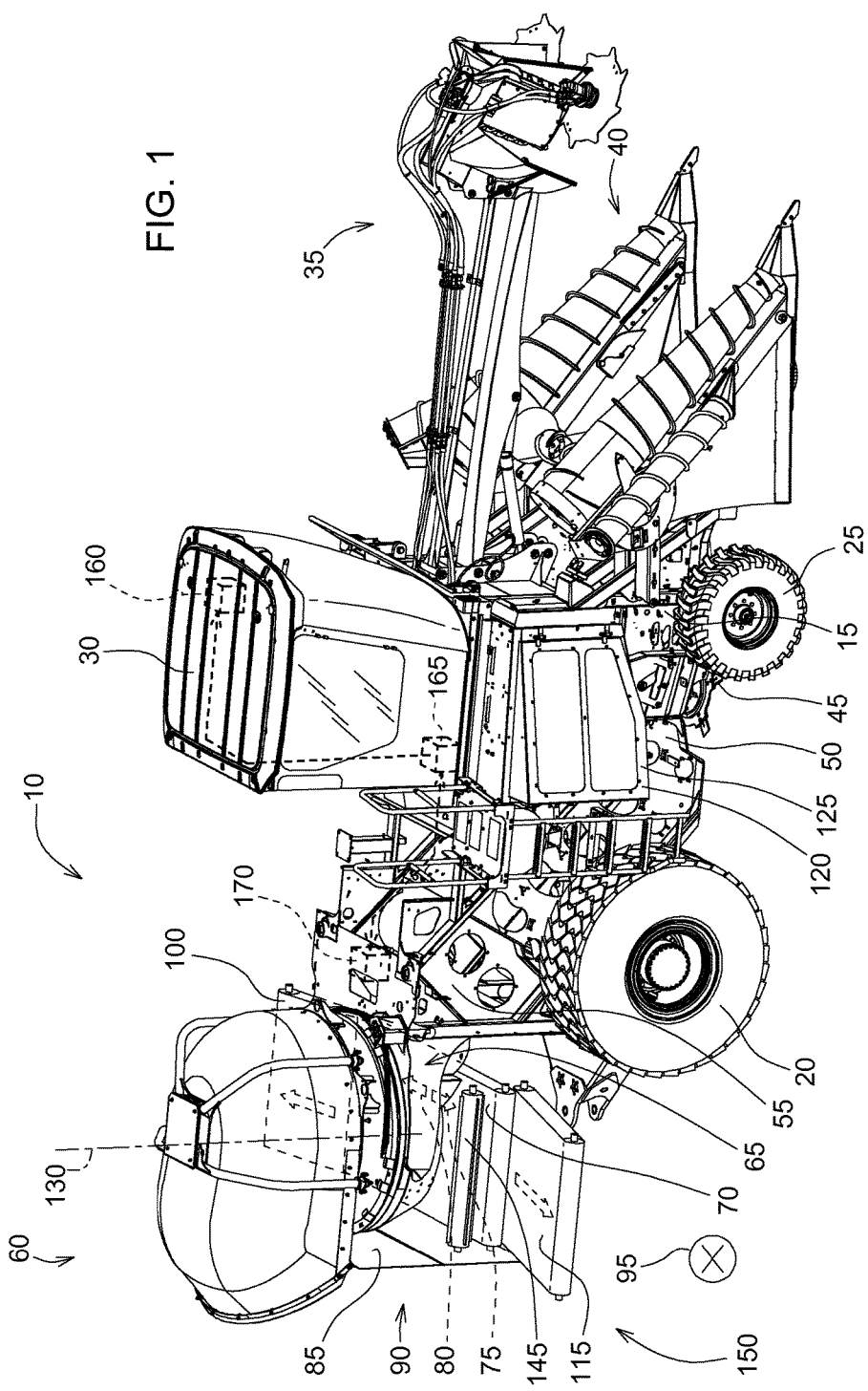
FIG. 1 is a perspective view of a sugarcane harvester according to one embodiment.

FIG. 1 illustrates a harvester 10, depicted as a wheeled sugarcane harvester. The harvester 10 includes a frame 15 supported on a pair of rear drive wheels 20 and a pair of steerable front wheels 25, only one of which is shown. It is also contemplated that the front wheels 25 could also be powered or tracks (not shown) could be used to support the harvester 10. An operator station 30 is located at a central, forward location of the frame 15, and located behind the operator station 30 is an engine (not shown), which provides the power for driving the wheels 20 and other driven components of the harvester 10.

The operator station 30 gives a seated or standing operator a vantage point for viewing the operation of front-mounted equipment including a topper mechanism 35 mounted to the frame 15 between right- and left-hand crop divider assemblies 40. Located just behind and inwardly of the front wheels 25 of the harvester 10, so as to be at opposite sides of a longitudinal centerline of the harvester, are right- and left-hand basecutters 45, only one of which is shown, having cutting blades located so as to overlap at the middle of the harvester 10.

Thus, during operation, the crop divider assemblies 40 straddle a row of cane stalks which pass beneath the frame 15 and are severed from the ground by the basecutters 45. The basecutters 45 deliver the cut stalks to the rear to a feeding device 50 that transports the cane stalks to a chopping device 55 located between and at a height above the rear drive wheels 20. The chopping device 55 cuts the cane stalks into lengths called billets which are fed into a primary extractor 60 that operates to clean unwanted material such as leaves and other crop debris from the billets. The billets then pass into an onboard storage 65 that accumulates the billets.

In some embodiments, the onboard storage 65 may be an onboard storage belt 70. The onboard storage belt 70 is configured to transport billets in a first direction 75 or in a second direction 80, opposite of the first direction 75.

A backboard 85 may be coupled to the onboard storage 65. The backboard 85 is configured to limit billets from falling off of the harvester 10.

Figure 2:
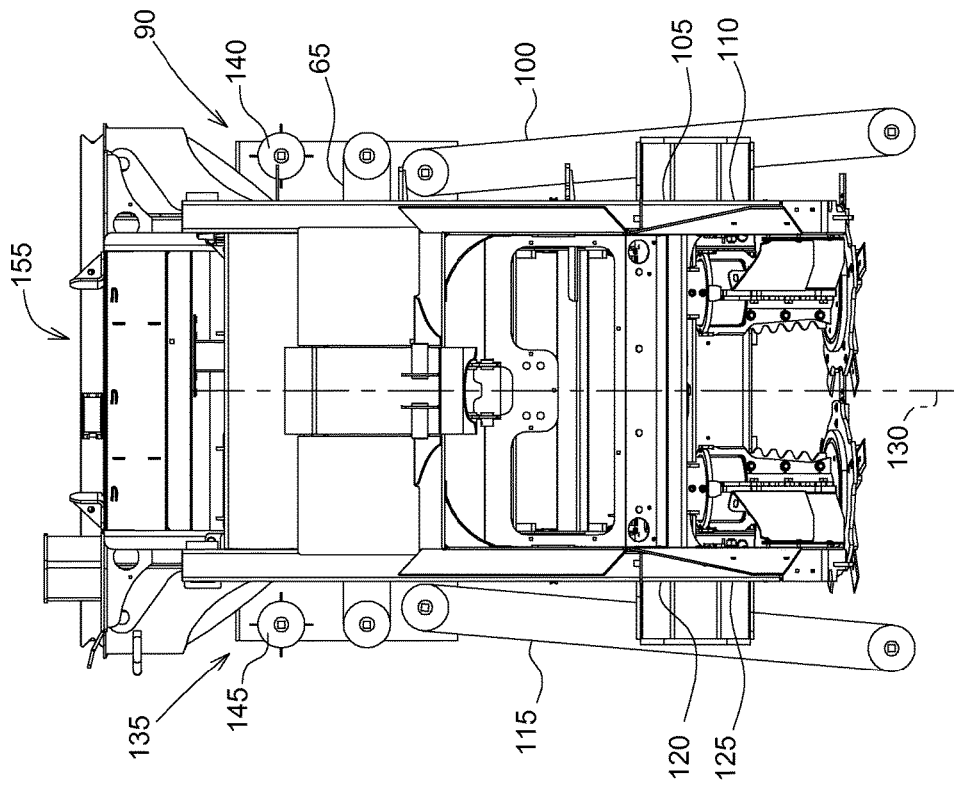
FIG. 2 is a front view of a portion of a sugarcane harvester according to another embodiment.

Referring to FIGS. 1 and 2, a billet transportation system 90 is positioned to receive billets from the onboard storage 65 and propel the billets to a target location 95. The target location 95 may be a wagon, cart, basket, or other object or location. A first belt 100 operating at a first speed is configured to receive billets from the onboard storage 65 and transport the billets away from a first portion 105 of the harvester 10. The first portion 105 may be the left side 110 of the harvester 10.

A second belt 115 operating at a second speed is configured to receive billets from the onboard storage 65 and transport the billets away from a second portion 120 of the harvester 10. The second portion 120 may be the right side 125 of the harvester 10. The first belt 100 and the second belt 115 may be moved relative to a vertical axis 130 to propel the billets to the target location 95.

A metering device 135 is positioned to control the flow of billets from the onboard storage 65 to the first belt 100 and the second belt 115. The metering device 135 may include a first paddle wheel 140 configured to control the flow of billets to the first belt 100 and a second paddle wheel 145 configured to control the flow of billets to the second belt 115.

Figure 3:
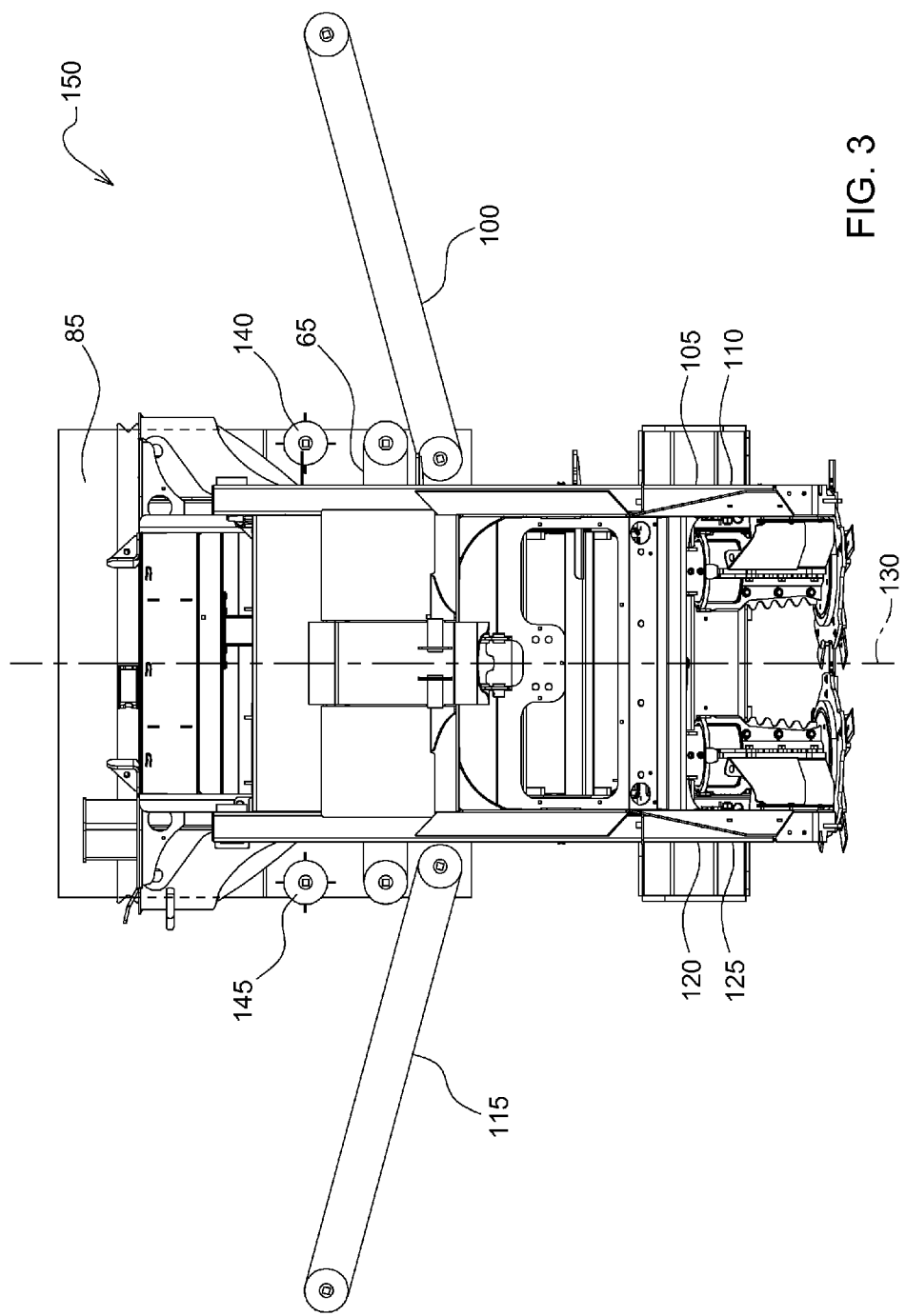
FIG. 3 is a front view of a portion of the sugarcane harvester of FIG. 2.

Referring to FIGS. 1 and 3, the billet transportation system 90 of the harvester 10 is shown in an operation position 150. In the operation position 150, the first and second belts 100, 115 extend outwardly away from the first and second portions 105, 120, respectively, of the harvester 10.

With reference to FIG. 2, the billet transportation system 90 of the harvester 10 is shown in a transport position 155. In the transport position 155, the first and second belts 100, 115 are folded downwardly relative to the vertical axis 130. The backboard 85 is folded towards the operator station 30.

Figure 4:
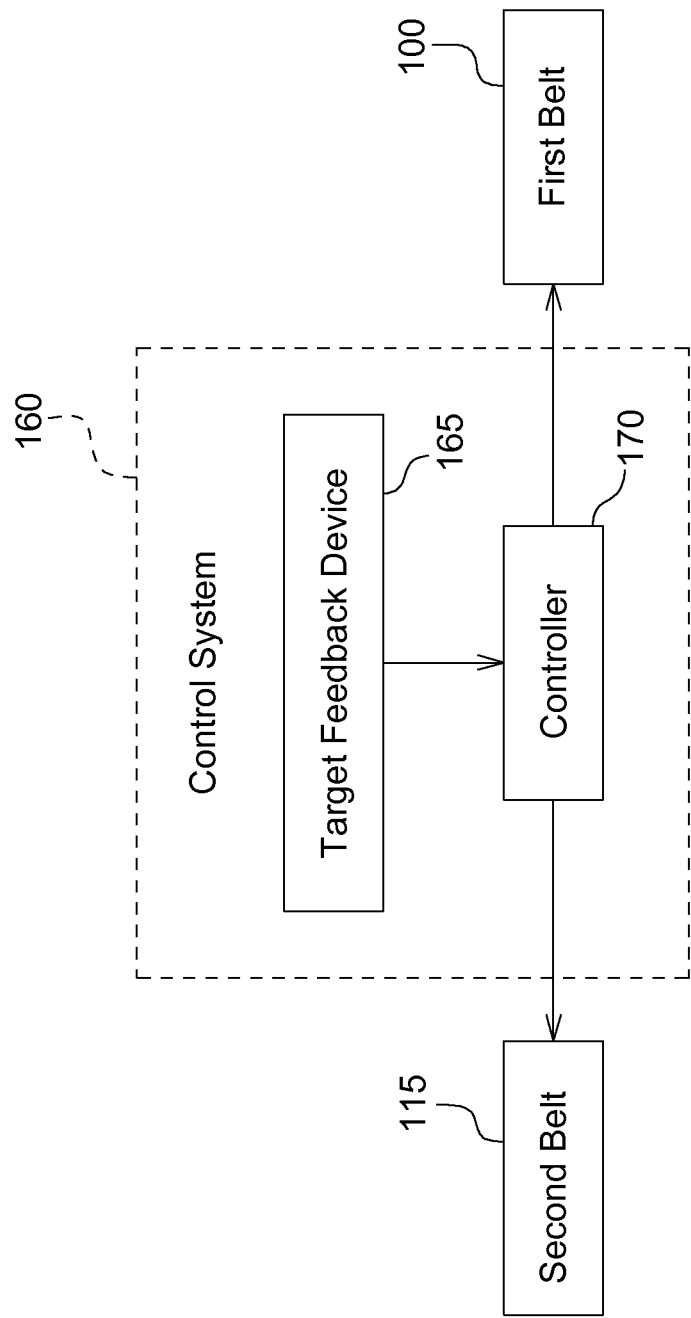
FIG. 4 is a schematic of a control system of a sugarcane harvester according to yet another embodiment.

Referring to FIG. 4, a control system 160 is provided on the harvester 10 to control the propulsion of the billets to the target location 95. The control system 160 includes a target feedback device 165 providing a target feedback signal. The target feedback signal is indicative of the position and velocity of the target location 95. A controller 170 is in communication with the target feedback device 165 and is configured to automatically adjust at least one of a first position of the first belt 100 relative to the vertical axis 130, a second position of the second belt 115 relative to the vertical axis 130, a first speed of the first belt 100, and a second speed of the second belt 115 to propel the billets to the target location 95.

Various features are set forth in the following claims.

What is claimed is:

1. A sugarcane harvester, comprising:
   a basecutter configured to cut sugarcane;
   a feeding device in communication with the basecutter to receive and feed the cut sugarcane into the sugarcane harvester;
   a chopping device in communication with the feeding device, the chopping device configured to chop the cut sugarcane received from the feeding device into billets;
   a primary extractor in communication with the chopping device and configured to extract debris from the billets;
   an onboard storage in communication with the primary extractor and configured to receive billets;
   a billet transportation system in communication with the onboard storage and configured to receive billets and propel the billets to a target location, the billet transportation system comprising:
   a first belt configured to receive billets from the onboard storage and transport billets away from a first portion of the sugarcane harvester;
   a second belt configured to receive billets from the onboard storage and transport billets away from a second portion of the sugarcane harvester; and
   at least one metering device configured to control the flow of billets from the onboard storage to the first and second belts; and
   a control system for controlling the propulsion of the billets to the target location, the control system comprising a target feedback device providing a target feedback signal indicative of the target location and velocity and a controller in communication with the target feedback device and configured to automatically adjust at least one of a first position of the first belt relative to a vertical axis, a second position of the second belt relative to the vertical axis, a first speed of the first belt, and a second speed of the second belt to propel the billets to the target location.

2. The sugarcane harvester of claim 1, wherein the onboard storage is an onboard storage belt configured to transport billets to the first belt and the second belt.

3. The sugarcane harvester of claim 2, wherein the onboard storage belt is configured to move billets in a first direction and in a second direction, opposite the first direction.

4. The sugarcane harvester of claim 1, wherein at least one of the first belt and the second belt is moved relative to a vertical axis to propel the billets to the target location.

5. The sugarcane harvester of claim 1, wherein at least one of a first speed of the first belt and a second speed of the second belt is adjusted to propel the billets to the target location.

6. The sugarcane harvester of claim 1, further comprising a backboard coupled to the onboard storage and configured to limit billets from falling off the sugarcane harvester.

7. A sugarcane harvester, comprising:
   a basecutter configured to cut sugarcane;
   a feeding device in communication with the basecutter to receive and feed the cut sugarcane into the sugarcane harvester;
   a chopping device in communication with the feeding device, the chopping device configured to chop the cut sugarcane received from the feeding device into billets;
   a primary extractor in communication with the chopping device and configured to extract debris from the billets;
   an onboard storage in communication with the primary extractor and configured to receive billets; and
   a billet transportation system in communication with the onboard storage and configured to receive billets and propel the billets to a target location, the billet transportation system comprising:
   a first belt configured to receive billets from the onboard storage and transport billets away from a first portion of the sugarcane harvester;
   a second belt configured to receive billets from the onboard storage and transport billets away from a second portion of the sugarcane harvester; and
   at least one metering device configured to control the flow of billets from the onboard storage to the first and second belts, wherein the metering device comprises a first paddle wheel configured to control the flow of billets to the first belt and a second paddle wheel configured to control the flow of billets to the second belt.

8. The sugarcane harvester of claim 1, wherein the first portion of the sugarcane harvester is the left side and the second portion of the sugarcane harvester is the right side.

9. The sugarcane harvester of claim 1, wherein the sugarcane harvester is configured to convert from an operation position to a transport position where the first belt and the second belt are moved downwardly relative to a vertical axis.

10. A combination, comprising:
a billet transportation system for a sugarcane harvester having an onboard storage for receiving billets, the billet transportation system comprising:
a first belt configured to receive billets from the onboard storage and transport billets away from a first portion of the sugarcane harvester to a target location;
a second belt configured to receive billets from the onboard storage and transport billets away from a second portion of the sugarcane harvester to the target location;
at least one metering device configured to control the flow of billets from the onboard storage to the first and second belts; and
a control system for controlling the propulsion of the billets to the target location, the control system comprising a target feedback device providing a target feedback signal indicative of the target location and velocity and a controller in communication with the target feedback device and configured to automatically adjust at least one of a first position of the first belt relative to a vertical axis, a second position of the second belt relative to the vertical axis, a first speed of the first belt, and a second speed of the second belt to propel the billets to the target location.

11. The combination of claim 10, wherein the onboard storage is an onboard storage belt configured to transport billets to the first belt and the second belt.

12. The combination of claim 10, wherein at least one of the first belt and the second belt is moved relative to a vertical axis to propel the billets to the target location.

13. The combination of claim 10, wherein at least one of a first speed of the first belt and a second speed of the second belt is adjusted to propel the billets to the target location.

14. The combination of claim 10, further comprising a backboard coupled to the onboard storage and configured to limit billets from falling off the sugarcane harvester.

15. The combination of claim 10, wherein the metering device comprises a first paddle wheel configured to control the flow of billets to the first belt and a second paddle wheel configured to control the flow of billets to the second belt.

16. The combination of claim 10, wherein the first portion of the sugarcane harvester is the left side and the second portion of the sugarcane harvester is the right side.

17. The combination of claim 10, wherein the sugarcane harvester is configured to convert from an operation position to a transport position where the first belt and the second belt are moved downwardly relative to a vertical axis.

* * * * *